US008814272B2

(12) United States Patent
Poehlmann et al.

(10) Patent No.: US 8,814,272 B2
(45) Date of Patent: Aug. 26, 2014

(54) MOTOR-VEHICLE HEADREST

(75) Inventors: Christian Poehlmann, Amberg (DE);
Joerg Girbinger, Amberg (DE);
Gerhard Delling, Schmidgaden (DE);
Manfred Schlierf, Amberg (DE)

(73) Assignee: Grammer AG, Amberg (DE)

( * ) Notice: Subject to any disclaimer, the term of this patent is extended or adjusted under 35 U.S.C. 154(b) by 309 days.

(21) Appl. No.: 13/332,408

(22) Filed: Dec. 21, 2011

(65) Prior Publication Data
US 2012/0161490 A1    Jun. 28, 2012

(30) Foreign Application Priority Data

Dec. 23, 2010  (DE) .......................... 10 2010 055 802
Jan. 24, 2011   (DE) .......................... 10 2011 009 289

(51) Int. Cl.
*A47C 7/36*       (2006.01)
*B60N 2/48*       (2006.01)

(52) U.S. Cl.
CPC .................................. *B60N 2/4817* (2013.01)
USPC ...................................................... 297/410

(58) Field of Classification Search
CPC ................................................... B60N 2/4817
USPC ....................................................... 297/410
See application file for complete search history.

(56) References Cited

U.S. PATENT DOCUMENTS

| 6,068,337 A * | 5/2000 | De Filippo .................... 297/391 |
| 2005/0280305 A1* | 12/2005 | Gurtatowski et al. ......... 297/410 |
| 2006/0214491 A1* | 9/2006 | Metz et al. ..................... 297/410 |
| 2009/0058163 A1* | 3/2009 | Bokelmann et al. .......... 297/410 |
| 2009/0184556 A1* | 7/2009 | Bokelmann et al. .......... 297/410 |
| 2011/0291456 A1* | 12/2011 | Poehlmann et al. .......... 297/410 |

FOREIGN PATENT DOCUMENTS

| DE | 3636931 B | 6/1988 |
| DE | 19819504 B | 9/1999 |
| DE | 19958402 B | 8/2001 |

* cited by examiner

*Primary Examiner* — David R Dunn
*Assistant Examiner* — Alexander Harrison
(74) *Attorney, Agent, or Firm* — Andrew Wilford

(57) ABSTRACT

A headrest assembly securable to a motor-vehicle seat back part has a movable headrest and a rod fixed in the seat back and having a plurality of vertically spaced catch formations. A spring carried on the headrest has a pair of legs flanking the rod, elastically deflectable toward and away from the rod, and biased elastically toward the rod, and a crosspiece connecting the legs and fittable with one of the catch formations. An actuator shiftable in the slide relative to the spring has respective actuating formations engageable with the spring legs. The actuator is movable between a latching position in which the actuating formations are generally disengaged from the respective legs and the crosspiece engages the rod and an unlatching position in which the actuating formations engage the respective legs and press them into the released position.

14 Claims, 5 Drawing Sheets

MOTOR-VEHICLE HEADREST

FIELD OF THE INVENTION

The present invention relates to a headrest. More particularly this invention concerns an adjustable headrest for a motor-vehicle seat.

BACKGROUND OF THE INVENTION

Such a headrest is described in DE 198 19 504. In this headrest, the support rod is mounted in a rod support so as to be adjustable in height. A slide block is shiftable in a window-like recess of the rod support. The block is provided with an engagement projection on a side that faces the support rod. The block is biased against the support rod by a spring, so that a tooth the engagement projection drops into one of the notches of the support rod, depending on its position. To unlatch the support, the slide back is pulled against the spring force away from the rod The headrest according to DE 3,636,931 comprises a head contact part with support rods attached to it that are each mounted in a slide sleeve so as to be adjustable in height. The support rod has notches that are part of a latch for adjustment of the height of the head contact part relative to the slide. A generally U-shaped spring has two spring legs and a crosspiece. Each spring leg is provided with a bend that engages in the slide sleeve in such a manner that the engagement spring pivots about the bends when its free end is activated, and the crosspiece is released from the engagement notch. As soon as the crosspiece has been released from the engagement notch, the support rods can be moved relative to the slide sleeves.

In the case of the headrest according to DE 199 58 402, an engagement spring is fixed to a mount for the support rod of the headrest and is generally U-shaped and has a crosspiece that can engage into an engagement depression of the support rod. The crosspiece can be moved out of the engagement recess by a release element, thereby releasing the engagement connection and making it possible to pull the rod out of the accommodation opening.

Objects of the Invention

It is therefore an object of the present invention to provide an improved motor-vehicle headrest.

Another object is the provision of such an improved motor-vehicle headrest that overcomes the above-given disadvantages, in particular wherein the functional reliability and the operating convenience of a latch for locking the height position of the head contact part that has been adjusted are improved.

SUMMARY OF THE INVENTION

A headrest assembly securable to a relatively fixed motor-vehicle part has according to the invention a movable part shiftable in a vertical direction relative to the fixed part and a vertical rod fixed in one of the parts and having a plurality of vertically spaced catch formations. A spring carried on the other of the parts has a pair of legs flanking the rod, elastically deflectable toward and away from the rod, and biased elastically toward the rod, and a crosspiece connecting the legs and, in an engaged position, fitting with one of the catch formations and preventing movement of the slide other part along the rod and, in a released position, being clear of the formation and permitting movement of the slide and other part along the rod. An actuator shiftable in the slide relative to the spring has respective actuating formations engageable with the spring legs. The actuator is movable between a latching position in which the actuating formations are generally disengaged from the respective legs and the crosspiece engages the rod and an unlatching position in which the actuating formations engage the respective legs and press them into the released position.

Thus the headrest has a head contact part that is mounted by at least one support rod, so as to be adjustable in height relative to a backrest of a vehicle seat. The support rod can be fixed in the motor-vehicle part, normally a seat back, or in the headrest and can be movable in the other part. Normally according to the invention the rod is fixed in the seat back and movable in the headrest.

The support rod has engagement notches that are part of a latch. The engagement notches work together with the spring of the latch that is attached, for example, to a seat for guiding the support rod. The spring is biased in such a manner, for example, that a crosspiece of the latch spring is biased to produce engagement with an engagement notch.

The latch spring comprises at least two spring arms that are connected with one another by the crosspiece. The crosspiece is part of a bracket-shaped spring region, for example. An actuation formation is formed on every spring arm, for example. Each actuation formation works together with an actuation means of an actuation element. The actuation element can be formed by a slide, for example. The actuation element can be moved between a primary position and a secondary position.

The actuation formations of both spring arms can be moved in the same manner by a movement of the actuation element from its primary position to a secondary position in such a manner that the crosspiece is moved from a locking position in which it is in engagement with an engagement notch, into a released position in which it is out of engagement with an engagement notch. The statement that the actuation formations can be moved in the same manner means, in the sense of the invention, that they can be moved in the same direction at the same time.

In that the actuation elements are moved in the same manner, it is guaranteed that each end of the crosspiece connected with a spring arm is also moved into the released position or into the locking position in the same manner. Because of the uniform movement of the spring arms, a slight movement of the spring arms is sufficient to move the crosspiece between the released position and the locking position. This facilitates actuation of the latch and therefore ease of operation. Locking and unlocking of the latch are furthermore more functionally reliable, according to the invention, as compared with headrests from the state of the art.

According to one embodiment, the head contact part can be movable relative to the support rod, for example, and can be fixed in place in various relative positions by the latch. If, for example, the latch spring is attached to the one part, which is fixed in place on the head contact part, the head contact part can be locked in different relative positions by the interaction of the latch spring with engagement notches of the support rod. Alternatively or additionally, a latch spring that interacts with the support rod can also be attached to the other part.

According to another embodiment, each spring arm comprises an outer spring leg and an inner spring leg. In this manner, the outer spring leg can be moved elastically toward the inner spring leg. For example, the outer spring leg is in an engaged position in its non-deformed position in which a crosspiece that connects the first and the second spring arm is disposed in engagement with an engagement notch. The outer spring leg can be elastically deformed, for example, from the engaged position into a released position in which position the crosspiece is out of engagement with the engagement notch. The crosspiece is then biased to bring it out of the released position into the engaged position.

For example, the inner spring leg is attached to the one part. In this case, the inner spring leg, for example, is provided for attachment of the latch spring, while the outer spring leg can be elastically moved. One of the spring legs can be firmly held on the head contact part, for example, according to another embodiment.

According to another embodiment of the invention, the actuation element is formed by a slide. The slide is part of an actuator and can be activated, for example, by a handle that is also part of the actuator.

According to another embodiment, the actuation element has at least one movement converter assigned to it, by means of which a force is exerted on the latch spring when the actuation element is moved in a first direction, which force is directed in a second direction. The force on the latch spring can be directed transverse to the movement direction of the actuation element, for example.

The actuation means is formed, for example, by a projection. A projection can be formed on the actuation element in simple manner. For example, the projection can be formed on the actuation element. The projection can also be configured by a simple structure as a movement converter.

According to another embodiment of the invention, the actuation means comprises the movement converter.

For example, according to another embodiment, the movement converter is formed by a ramp or angled cam surface. The ramp is inclined, for example, at an acute angle relative to the movement direction of the actuation element. When the spring arm makes contact with a first region of the actuation element, the crosspiece is in the engaged position, for example. When the spring arm stands in contact with a specific region of the ramp, the crosspiece is disposed in the released position, for example.

In order to limit the degree of freedom of at least one spring arm, the degree of freedom of the spring arm is limited by a guide device, according to another embodiment of the invention. The guide device is formed by a wall, for example, particularly by a wall of the slide.

BRIEF DESCRIPTION OF THE DRAWING

The above and other objects, features, and advantages will become more readily apparent from the following description, reference being made to the accompanying drawing in which.

DETAILED DESCRIPTION

Figure 1:
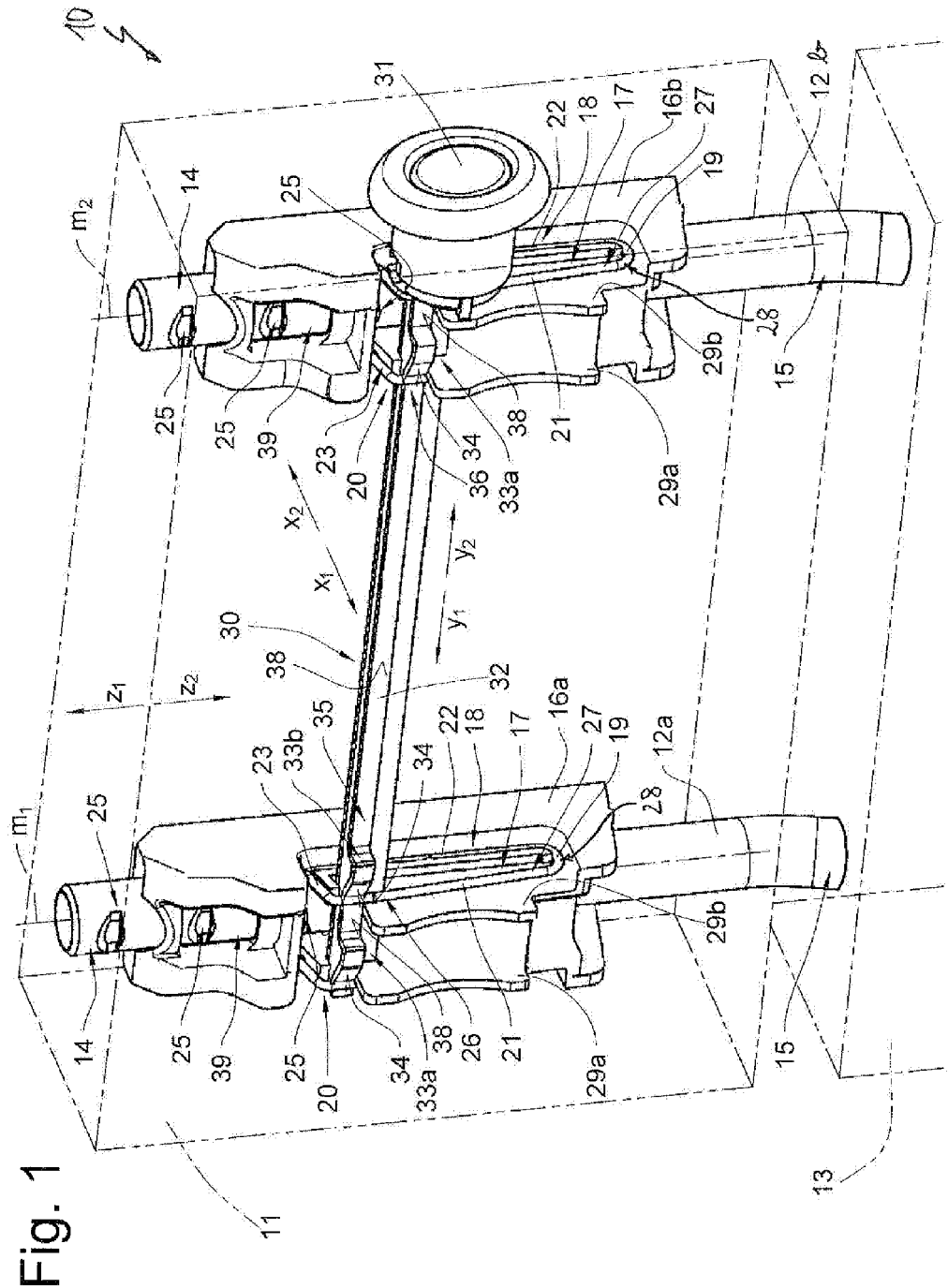
FIG. 1 is a schematic perspective view of the backrest of a vehicle seat, with the headrest according to the invention.

As seen in FIG. 1, a headrest 10 has a schematically illustrated head-engaging headrest 11 mounted on an also schematically illustrated back 13 of a motor-vehicle seat by support rods 12a and 12b. The headrest 11 can be moved parallel to generally vertical center axes $m_1$ and $m_2$ of upper ends 14 of the support rods 12a and 12b. Lower ends 15 of the support rods 12a and 12b are fixed in the back rest 13. Alternately it would be possible to fix the rods 12a and 12b in the headrest 11 and make them slidable in the seat back 13.

Slides 16a and 16b moveable vertically on the upper rod ends 14 are fixed to the headrest 11. The slides 16a and 16b have seats 39 in which the respective support rods 12a and 12b are guided. In this manner, the headrest 11 is mounted via the slides 16a and 16b so as to be movable relative to the ends 14 vertically in directions $z_1$ and $z_2$.

Furthermore, a complexly bent wire-type latch spring 17 is provided on each of the slides 16a and 16b. Each latch spring 17 has two horizontally spaced parts 19 and 20 each in turn having generally vertical outer and inner legs 21 and 22. Upper ends 26 of the outer spring legs 21 of each spring 17 are connected with one another by a respective connecting part 23 that includes a latching crosspiece 24 that can fit in notches 25 of the respective support rod 12a or 12b. A lower end 27 of the outer leg 21 of each spring 17 is connected with the respective inner spring leg 22 by a U-shaped bight 28.

The spring legs 21 and 22 form a U or a V with the U-shaped connecting part or bight 28. While the spring leg 22 is solidly held in the slide seat 18, the connecting part 22 together with the spring leg 21 can move relative to the spring leg 22. Thus, the crosspiece 24 can be moved between an engaged position in which it fits in one of the notches 25 and a released position in which it is clear of the notches 25. Two front-to-back guide fins 29a and 29b are formed on each of the slides 16a and 16b to guide and control the spring legs 21 during their movement between the engaged position and the released position, ensuring that their movement is purely front-to back in directions $x_1$ and $x_2$ parallel to the vehicle travel direction.

The crosspiece 24 is biased into the engaged position. Movement of the crosspiece 24 into the released position is effected by an actuator 30 that has an operating button or handle 31 as well as a push rod 32 extending along a horizontal axis y that is transverse to the travel direction $x_1$, $x_2$. The push rod 32 is provided with actuation regions 35 and 36b juxtaposed with the slides 16a and 16b. Each actuation region 35 and 36 has two teeth or projections 33a and 33b. Each projection 33a and 33b is provided with an angled cam face or ramp 34 that rises in the horizontal front-to-back direction $x_1$ with increasing displacement in the horizontal side-to-side direction $y_2$ transverse to the vehicle travel direction. Each ramp 34 works together with the upper end 26 of a respective outer leg 21 of a respective latch spring 17.

Figure 2:
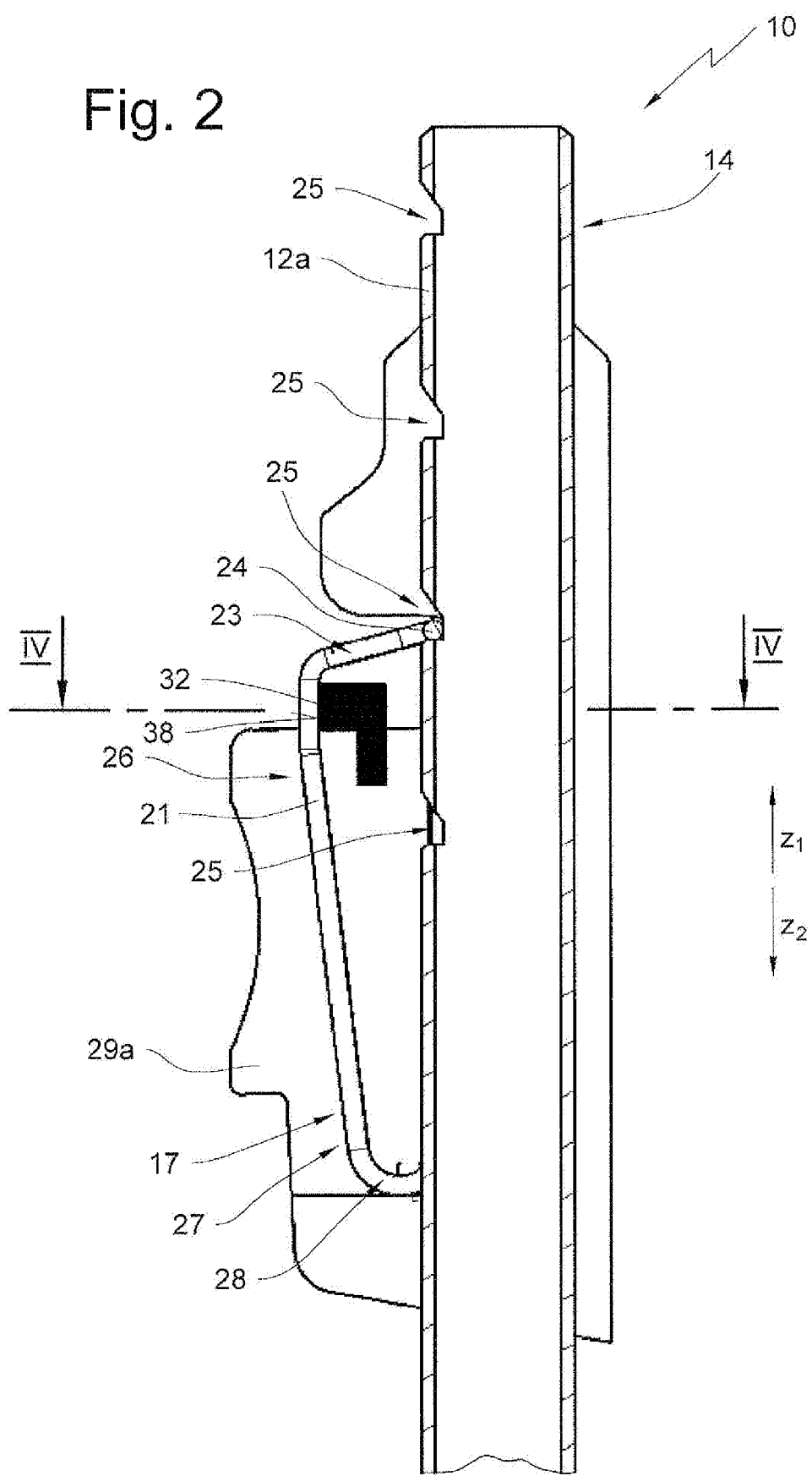
FIG. 2 is a schematic longitudinal section through the headrest, the head contact part not being shown for clarity of view and a latch being in the engaged position.
Figure 4:
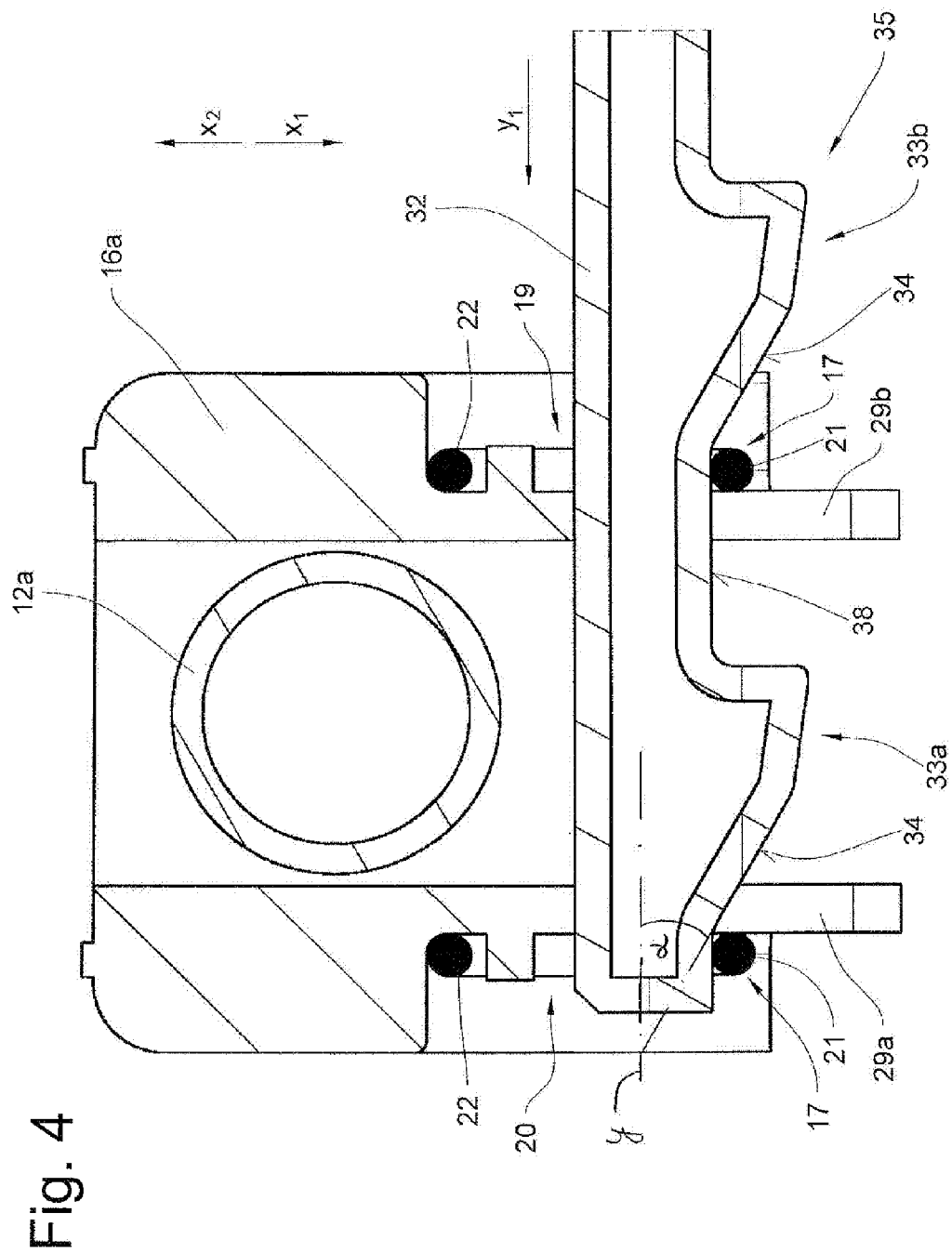
FIG. 4 is a schematic section taken along line IV-IV in FIG. 2.

In the engaged position of the crosspiece 24 according to FIGS. 2 and 4, the outer spring arms 21 lie against a side face 38 of the push rod 32. When the handle 31 is activated in the direction $y_1$, the push rod 32 is displaced in the direction $y_1$ so the ramps 34a and 34b slide in the direction $y_1$ relative to the actuation formations 37a and 37b and make the actuation formations 37a and 37b contact the ramp 34a and 34b. The ramps 34a and 34b thus act as movement converters and exert a force in the front-to-back direction $x_1$ on the legs 21 when the push rod 32 is moved in the direction $y_1$.

Figure 3:
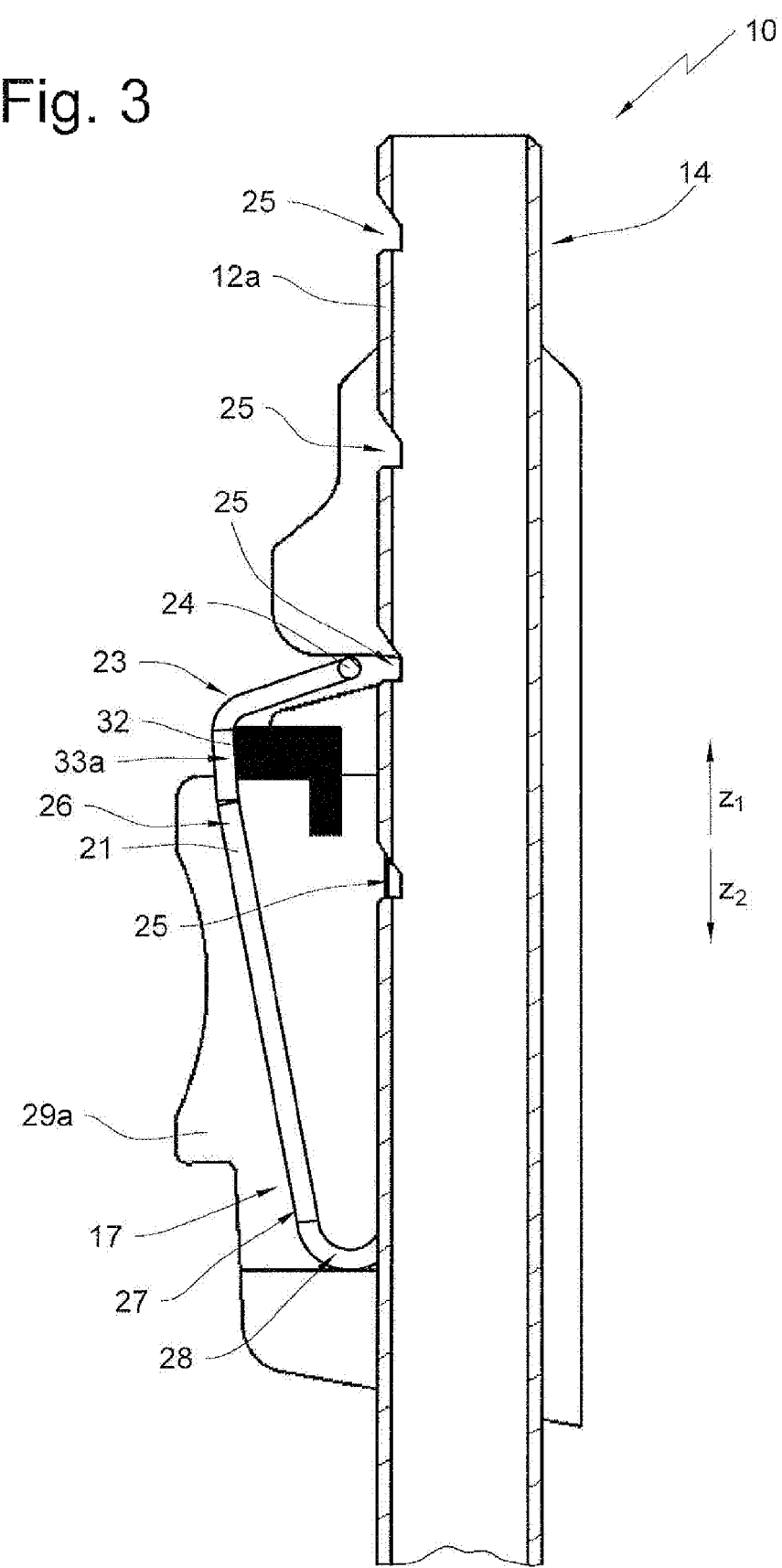
FIG. 3 is a view like FIG. 2 of the headrest with the latch in the released position.
Figure 5:
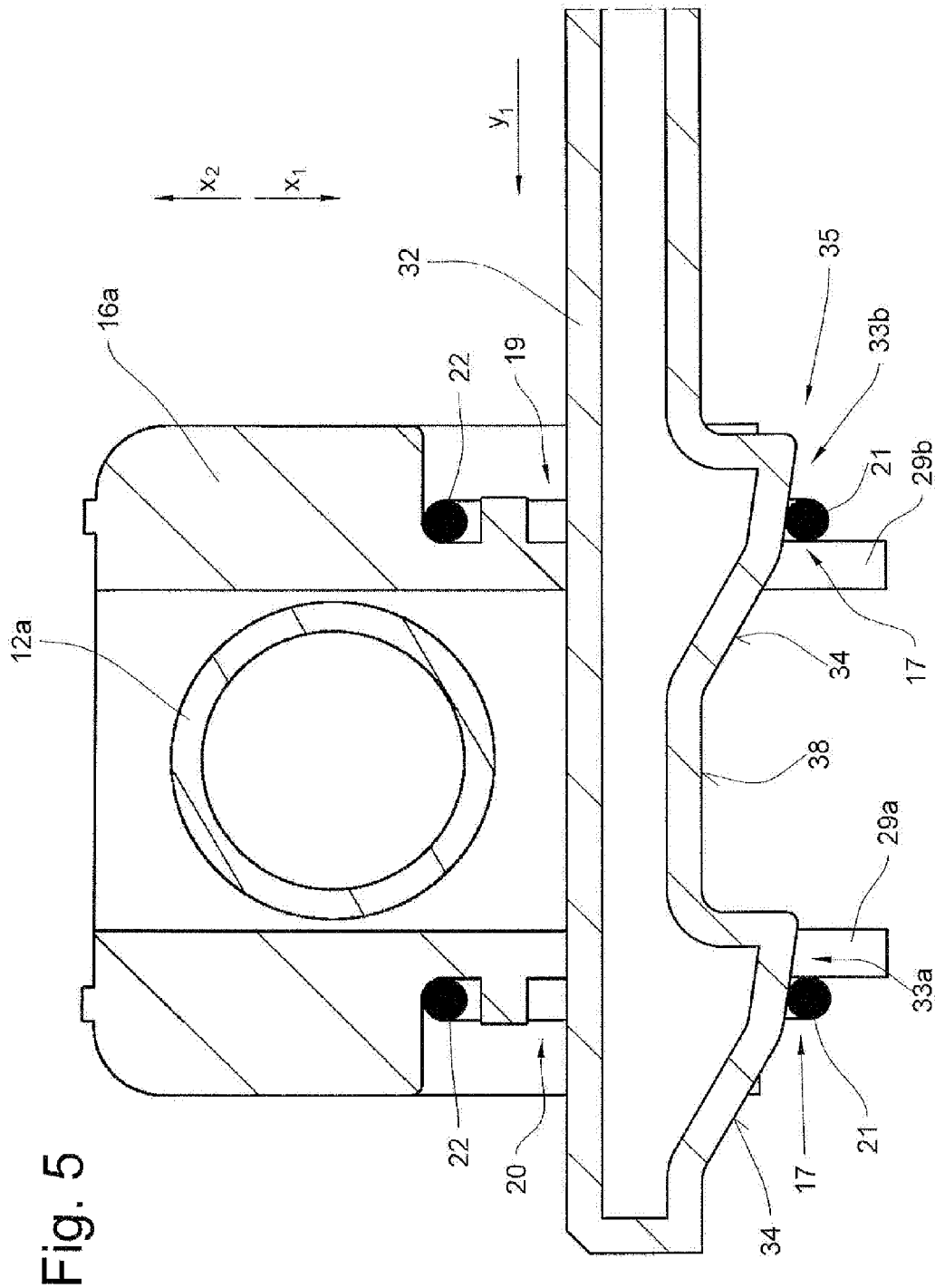
FIG. 5 is a view like FIG. 4 of the headrest but with the latch in the released position.

During movement of the ramps 34a and 34b relative to the spring legs 21, the crosspieces 24 of the springs 17 are cammed out of the engaged position shown in FIGS. 1 and 2 into the released position (see FIGS. 3 and 5). While the spring legs 21 are pivoted in the rearward direction $x_1$ together with the connecting part 23, and because of the force in the direction $x_1$ the crosspiece 24 is displaced out of the engagement notch 25 into the released position so that the headrest 11 together with the slides 16a and 16b can be moved relative to the respective rods 12a and 12b. Both actuation legs 21 of each latch spring 17 are deformed in the same manner, at the same time, so that the crosspiece 24 remains in the same relative orientation with relative to the engagement notch 25, that is extending in the side-to-side directions $y_1$ and $y_2$ during movement between the engaged position and the released position. In other words, a longitudinal axis of the crosspiece 24 in the engaged position is parallel to the longitudinal axis of the crosspiece 24 in the released position.

In the released position, a force in the direction $x_2$ is exerted on the ramp 34 by the reset force of the spring leg 21 in the direction $x_2$ to bias the push rod 32 in the same direction $x_2$ because of the small acute angle α between the ramp 34 and the movement direction $y_1$, $y_2$ of the push rod 32, if force is no longer exerted on the handle 31 in the direction $y_1$.

We claim:

1. A headrest assembly securable to a relatively fixed motor-vehicle part, the assembly comprising:
    a movable part shiftable in a vertical direction relative to the fixed part;
    a vertical rod fixed in one of the parts and having a plurality of vertically spaced catch formations;
    a spring carried on the other of the parts and having
        a pair of outer legs elastically deflectable toward and away from the rod, and biased elastically toward the rod, and
        a crosspiece connecting the outer legs and shiftable therewith between an engaged position fitting with one of the catch formations and preventing movement of the movable part along the rod and a released position clear of the one formation and permitting movement of the movable part along the rod; and
    an actuator shiftable in the other of the parts relative to the spring and having respective actuating formations each engageable with a respective one of the outer spring legs, the actuator being movable between a latching position in which the actuating formations are generally disengaged from the respective outer legs and the crosspiece is biased by the outer legs into the engaged position and an unlatching position in which the actuating formations engage the respective outer legs and press the crosspiece into the released position.

2. The headrest assembly defined in claim 1, further comprising:
    a slide fixed in the other part, movable along the rod, and carrying the spring.

3. The headrest assembly defined in claim 2, wherein the spring also has inner legs each connected to a respective one of the outer legs with one inner leg and the respective outer leg being to each side of the rod.

4. The headrest assembly defined in claim 3, wherein the inner legs are fixed in the support and the spring includes connecting bights each extending between a respective one of the inner legs and the respective outer leg.

5. The headrest assembly defined in claim 4, wherein the outer legs extend generally parallel to each other, the inner legs also extend generally parallel to each other, and the crosspiece extends transversely of the outer legs.

6. The headrest assembly defined in claim 5, wherein the spring is formed by a bent spring wire of generally uniform section.

7. The headrest assembly defined in claim 2, wherein the slide is traversed by the rod.

8. The headrest assembly defined in claim 4, wherein the crosspiece is movable in a predetermined direction between the respective engaged and released positions and the slide is formed with guides extending in the direction and on which the connecting bights slide on movement of the crosspiece between the engaged and released position.

9. The headrest assembly defined in claim 1, wherein the crosspiece is movable in a predetermined direction between the respective engaged and released positions and the actuator is movable in a direction transverse to the predetermined direction on movement between the latching and unlatching positions.

10. The headrest assembly defined in claim 9, wherein the actuating formations are spaced apart in the transverse direction.

11. The headrest assembly defined in claim 10 wherein the actuating formations are ramps.

12. The headrest assembly defined in claim 1 wherein the fixed part is a seat back and the movable part is a headrest.

13. The headrest assembly defined in claim 1 wherein the outer legs flank the rod.

14. A headrest assembly securable to a relatively fixed motor-vehicle part, the assembly comprising:
    a slide shiftable in a vertical direction relative to the fixed part;
    a vertical rod fixed in one of the parts and having a plurality of vertically spaced catch formations;
    a spring carried on the other of the parts and having
        a pair of outer legs elastically deflectable toward and away from the rod, and biased elastically toward the rod,
        a crosspiece connecting the outer legs and shiftable therewith between an engaged position fitting with one of the catch formations and preventing movement of the slide along the rod and a released position clear of the formation and permitting movement of the slide along the rod,
        a pair of inner legs each connected to a respective one of the outer legs; and
    an actuator shiftable in the other of the parts relative to the spring and having respective actuating formations each engageable with a respective one of the outer spring legs, the actuator being movable between a latching position in which the actuating formations are generally disengaged from the respective outer legs and the crosspiece is biased by the outer legs into the engaged position and an unlatching position in which the actuating formations engage the respective legs and press the crosspiece into the released position.

* * * * *